United States Patent [19]

Wilson et al.

[11] 4,080,140
[45] Mar. 21, 1978

[54] APPARATUS FOR FORMING BELLS ON PLASTIC TUBES

[75] Inventors: Clyde E. Wilson; Robert D. Nicoson, both of Brazil, Ind.

[73] Assignee: Wilson-Tek Corporation, Brazil, Ind.

[21] Appl. No.: 754,165

[22] Filed: Dec. 27, 1976

Related U.S. Application Data

[63] Continuation-in-part of Ser. No. 512,230, Oct. 4, 1974, abandoned, and Ser. No. 602,128, Aug. 5, 1975, Pat. No. 4,032,282, each is a continuation-in-part of Ser. No. 400,165, Sep. 24, 1973.

[51] Int. Cl.² ............................................. B29C 17/00
[52] U.S. Cl. .......................... 425/393; 425/DIG. 218; 249/181
[58] Field of Search ............. 425/392, 393, DIG. 218; 249/178, 181

[56] References Cited

U.S. PATENT DOCUMENTS

| 3,266,100 | 8/1966 | Belanger | 249/181 X |
| 3,476,351 | 11/1969 | Burdett | 249/181 X |
| 3,704,978 | 12/1972 | Leier et al. | 425/393 |

*Primary Examiner*—Robert L. Spicer, Jr.

[57] ABSTRACT

Apparatus for forming internally grooved bells on plastic tubes, having a mandrel comprising coaxial front and rear mandrel sections spaced apart to form a gap, angularly spaced supporting pins joining internal flanges on the elements across the gap, two sets of alternating core sections in the gap, one set having inwardly converging sides and the other having inwardly diverging sides, and an expanding mechanism comprising an actuator shaft rotatably supported in the mandrel, two rotary actuating plates mounted on the shaft on opposite sides of the core sections, and two guide plates mounted in the mandrel in fixed positions. The guide plates have a plurality of spaced radial guide slots, and the actuating plates have a plurality of inclined cam slots that extend radially outwardly across the guide slots. Follower pins on the core sections project into the cam slots and guide slots to be cammed and guided thereby as the actuating plates are rotated back and forth. In a functionally similar second embodiment, the guide plates are tied together in an assembly that supports the front mandrel section, and the shaft is shapted to receive and locate the actuating plates, and to permit easy disassembly for service.

14 Claims, 6 Drawing Figures

APPARATUS FOR FORMING BELLS ON PLASTIC TUBES

CROSS-REFERENCE TO RELATED APPLICATIONS

This application is a continuation-in-part of copending application Ser. No. 512,230, filed Oct. 4, 1974, now abandoned, and of application Ser. No. 602,128, filed Aug. 5, 1975 now U.S. Pat. No. 4,032,282, both entitled APPARATUS FOR FORMING BELLS ON PLASTIC TUBES, and both of these were continuations-in-part of application Ser. No. 400,165, filed Sept. 24, 1973, having the same title.

BACKGROUND OF THE INVENTION

In recent years, the place of heavy cast iron, steel and concrete pipe has largely been taken over by pipe made by the extrusion of plastic materials which are not only lighter in weight but appear to have comparable resistance to deterioration in certain applications such as drainage and soil work.

Pipes of this type, having diameters in the range of two inches or more, usually are formed in sections of uniform length, one end of each section having a radial enlargement, or bell, sufficient to receive the unenlarged end of another similar pipe.

The inside diameter of the bell is sufficiently large to easily receive the end of the next section of pipe and may be large enough to allow a sealing material to be packed in around the joint. In other cases, the bell may be provided with an internal annular recess into which a sealing material, such as a ring of resilient material, is inserted, and the adjacent pipe end is forced in beyond the sealing ring. However, difficulty has been experienced in the formation of the annular recess in such bells because it requires the use of apparatus capable of deforming outwardly only a portion of the axial length of the bell while the material is in a plastic condition, and removing the apparatus after the plastic has solidified.

Multi-section expanding cores having two dissimilar groups of interfitting core sections are known but these devices usually require one of the groups of core sections, or an elongated wedge-like expander, to be moved in an axial direction during contraction and expansion. Other types of core means are known in which one, or both, of the core sections pivot about axes which are axially remote from the plane of their radial movement. In both cases, it is difficult to maintain either circumferential or radial alignment of the core sections in their expanded positions with the result that irregularities are produces in the internal annulus produced in the finished pipe bell, which irregularities have a deleterious effect on a sealing ring inserted therein as well as on the effectiveness of the seal itself when the adjacent pipe end is in place. Moreover, the equipment made in accordance to the prior art often is bulky and complex in construction, and the actuating mechanisms, in particular, are complex and lacking in ease and precision of control.

Therefore, an object of the present invention is to provide a mandrel of the type having two groups of expandable and contractible core sections for producing an outwardly deformed annulus on a plastic pipe bell, in which the core sections remain at all times in the same common radial plane and in which these sections do not tilt in any way during their movement in contraction and expansion, and in particular, to provide an improved and simplified actuating mechanism in such a mandrel that is positive and precise in its operation.

SUMMARY OF THE INVENTION

The present invention resides in an apparatus of the foregoing character in which the core sections are moved between expanded or projected and contracted positions by an actuating mechanism comprising a coaxial actuator shaft rotatably mounted in the mandrel, a pair of actuating plates that are mounted on the shaft on opposite sides of the core sections and formed with a plurality of cam slots that are inclined radially outwardly, and a pair of guide plates that are mounted on the mandrel in axially and angularly fixed positions and are formed with spaced radial guide slots extending across the cam slots in overlying relation. The core sections have followers which project into both a cam slot and the overlying portion of a guide slot, to be cammed and guided simultaneously, in and out, by the two plates as the actuating plates are rotated back and forth by the actuator shaft.

The mandrel is formed in two front and rear tubular sections disposed in spaced coaxial relation, the front section being supported on the rear section by supporting means which extend through the actuating and guide plates. In a first embodiment, elongated supporting pins are secured at opposite ends to the two mandrel sections and extend through arcuate, coaxial clearance slots in the actuating plates, radially inwardly from the collapsed positions of the core sections. In a second embodiment, that is functionally the same but somewhat easier to disassemble for service, the guide plates are rigidly tied together adjacent the actuator shaft, and the outer portion of each is fixed to the adjacent mandrel section, so that the guide plates form an assembly that serves as the supporting means for the front mandrel section.

In the first embodiment, the cam slots are basically straight, inclined slots, with short outer end portions lying generally on an arc that is coaxial with the mandrel to form a "dwell" for holding the pins in the outwardly expanded positions. In the second embodiment, the cam slots are arcuate, without "dwells" at the outer end portions.

To determine the expanded position of the core sections, an internal annular shoulder is formed on at least one of the mandrel sections, and opposed external arcuate shoulders are formed on the core sections. These shoulders constitute easily machined locating surfaces for limiting outward movement of the core sections.

Other aspects and advantages of the invention will become apparent from the following detailed description, taken in conjunction with the accompanying drawings.

DETAILED DESCRIPTION OF THE FIRST EMBODIMENT

Figure 1:
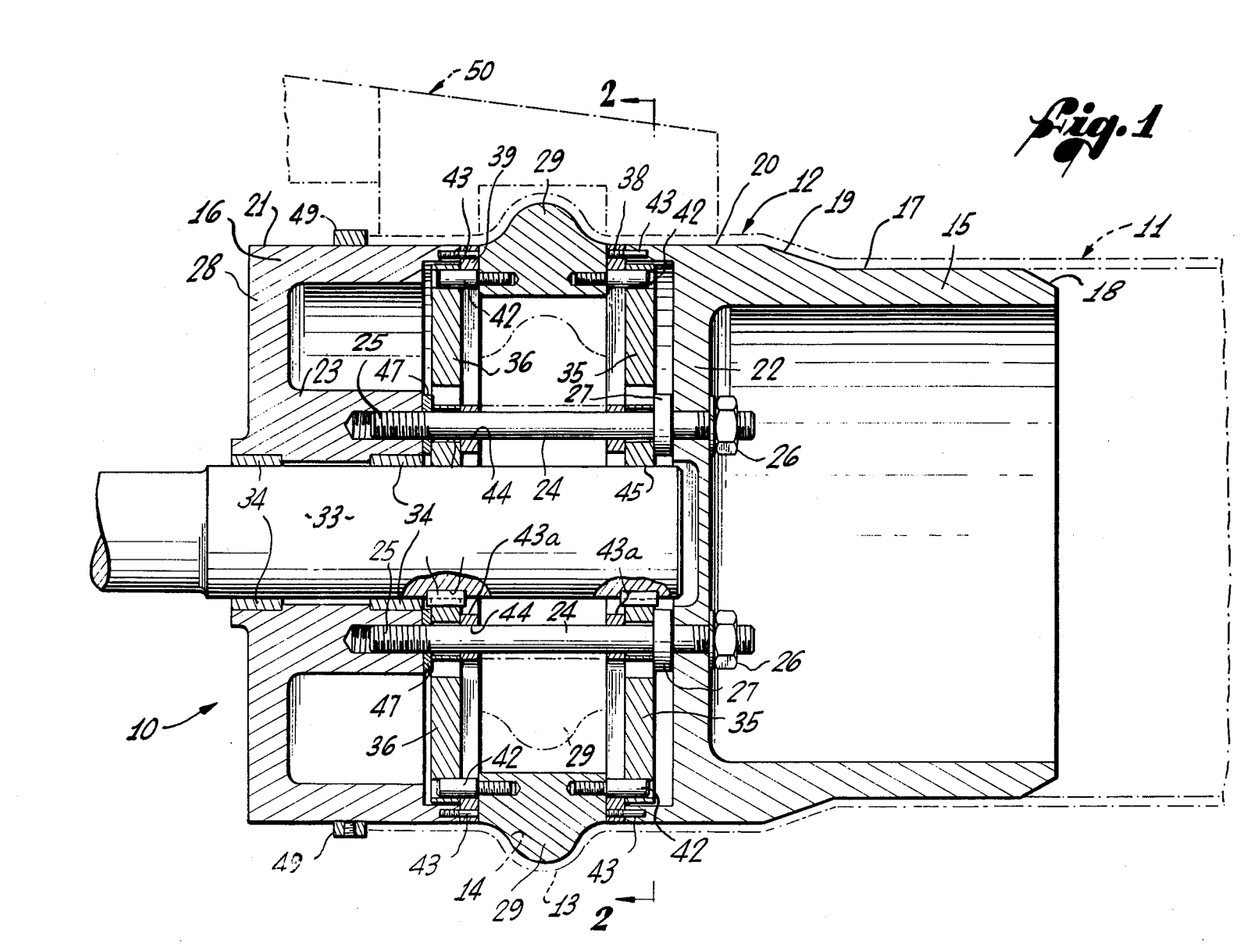
FIG. 1 is a fragmentary cross-sectional view taken substantially in a longitudinal plane through an apparatus in accordance with the present invention, with the positions of an external split die section and of a tube being belled shown in dot-dash lines.
Figure 2:
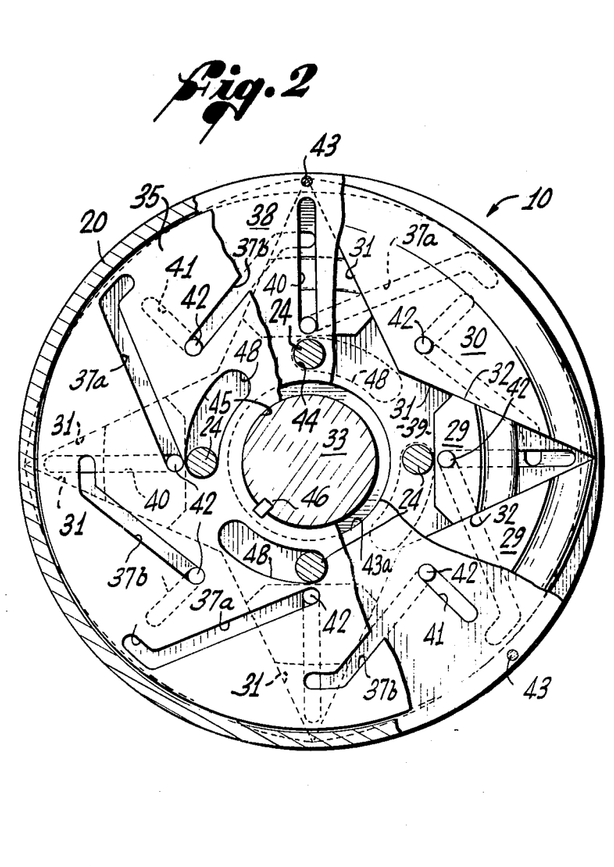
FIG. 2 is a transverse cross-sectional view taken substantially along line 2—2 of FIG. 1, with parts broken away and shown in cross-section, the core sections being collapsed.
Figure 3:
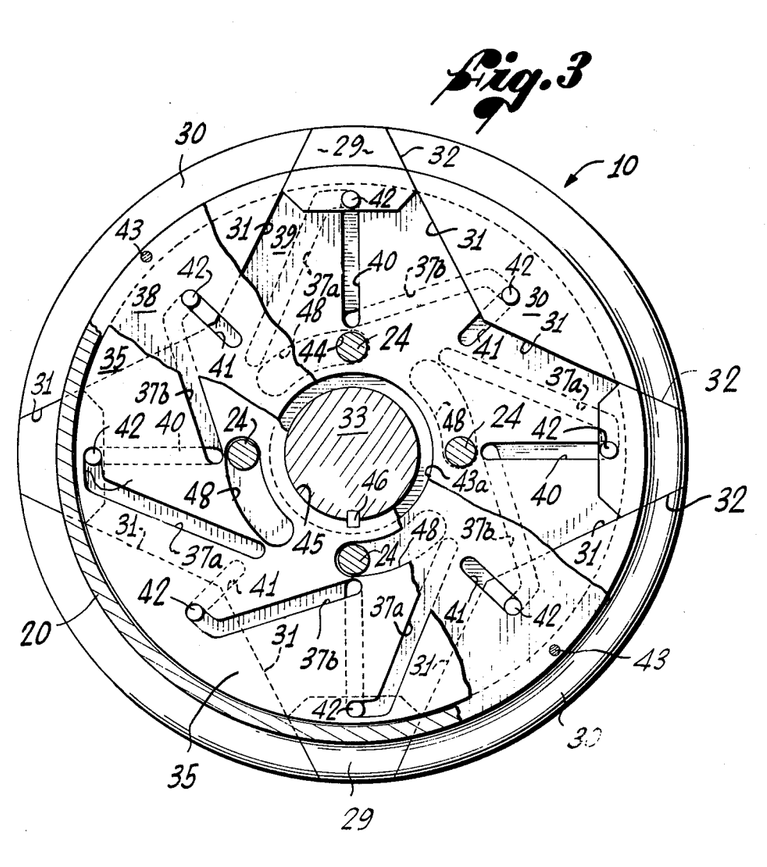
FIG. 3 is a view similar to FIG. 2 with parts in moved positions to show the core sections expanded.

As shown in FIGS. 1 through 3 for purposes of illustration, the invention is embodied in an apparatus, indicated generally by the reference number 10, for enlarging one end portion of a plastic tube 11, shown in dot-dash lines in FIG. 1, to form a so-called bell 12 on the tube, and also to form a raised annular bead 13 around the bell, defining an internal annular groove 14 for receiving a seal (not shown). Such tubes are belled while in a heated condition, and then are cooled on the apparatus so as to be set in the belled condition, before being removed.

As shown most clearly in FIG. 1, the apparatus generally comprises an elongated mandrel formed by front and rear mandrel sections 15 and 16, typically of circular cross-section, that are disposed in spaced coaxial relation with a gap between them. The front section 15, on the right in FIG. 1, has a forward portion having an outer surface 17 of a diameter approximately the same as the inside diameter of the tube 11, with a bevel 18 at its free end facilitating entry into the tube, an intermediate beveled portion 19, and a rear portion having an outer surface 20 of the diameter that is to be the inside diameter of the pipe bell. Across the gap, the outer surface 21 of the rear mandrel section 16 typically is of the same diameter as the diameter of the rear portion of the front section.

Both mandrel sections are hollow or tubular, and internal flanges 22 and 23 are formed on the sections to provide mounting surfaces adjacent the gap, the flange 22 extending inwardly from the rear end of the front section, and the flange 23 being an internal boss that is coaxial with the rear section. These flanges are joined together by a series of spaced, longitudinally extending supporting pins 24, one end of each pin being threaded at 25 into the front end of the rear flange 23, and the other end extending through holes in the front flange 22 and fixed thereto by nuts 26 on one side, clamping the flange against spacer collars 27 on the bolts.

In this manner, the front section 15 is mounted on the rear section 16 without need for support other than the pins 24. The rear section has a rear end wall 28 and is externally supported.

Positioned in the gap between the two mandrel sections are two groups of segmental core sections 29 and 30 constituting expandable and contractable core means which, when expanded, form a raised annular circumferential projection in the form of a bead, of circular transverse cross-section, projecting beyond the adjacent outer surfaces 20 and 21 of the mandrel sections. This bead forms the internal grooves 14 in the tubes 11. When contracted or collapsed, the core means are retracted into the gap to permit removal of a belled tube from the mandrel.

As shown in FIGS. 2 and 3, the core sections 30 are generally triangular in transverse cross-sectional shape, having arcuate outer surfaces and radially inwardly converging side surfaces 31 meeting at an apex constituting the inner end of the core section. The other core sections 29 alternate with the sections 30 and have arcuate outer surfaces of angularly shorter extent than the sections 29, and radially inwardly diverging side surfaces 32 in continuous, flat-sliding engagement with the side surfaces of the other core sections. In this instance, there are four of each type of core section.

The outer surfaces of the core section are formed on the same outside diameters, in transverse section, and have the same longitudinal contour, so that the bead that is formed when the core means are expanded is, in effect, a continuous annular bead that rises from the level of the front mandrel surface 20, forms a general semi-circle in longitudinal cross-section, and then falls back to the level of the rear mandrel surface 21. It is to be noted, however, that this contour is only illustrative, and the various other contours may be provided to produce sealing grooves of various shapes in plastic tubes.

Expansion and contraction of the core means are controlled by actuating means including a rotary actuator shaft 33 that is mounted in the mandrel in coaxial relation therewith, herein being journaled in bearings 34 (FIG. 1) in the flange or boss 23, and is adapted to be rotated back and forth by an external actuator (not shown). The front end portion of the shaft projects forwardly beyond the front end of the boss 23, and carries the means for expanding and contracting the core means as an incident to such back-and-forth rotation.

In accordance with the present invention, two actuating plates 35 and 36, herein discs, are mounted on the actuator shaft 33 on opposite sides of the core sections, and are formed with a plurality of cam slots $37^a$ and $37^b$ that are inclined radially outwardly, and two guide plates 38 and 39, herein also discs, are mounted in the mandrel in axially and angularly fixed positions, and are formed with a plurality of spaced, radial guide slots 40 and 41, extending across the cam slots in overlying relation, that is, the slots are in side-by-side relation and a portion of each always opens laterally into a portion of the other. Pins 42 are fixed to the core sections to project forwardly and rearwardly therefrom into associated pairs of slots, and thus are mounted to travel along the slots as the actuating plates are rotated.

In other words, the cam slots and the pins constitute cam-and-follower means connecting the actuating plates to the core sections, and the radial guide slots confine the motion of the pins, and thus the core sections, to straight in-and-out movement. The guide slots 40 are provided for the sections 29, and are longer than the slots 41 which are provided for the sections 30. This is due to the difference in the amount of radial movement of the two different types of core sections, that can be seen in FIGS. 2 and 3. Similarly, the slope and radial travel of the cam slots $37^a$ are greater than the slope and radial travel of the slots $37^b$.

As shown most clearly in FIG. 1, the guide plates 38 and 39 are disposed against the opposite sides of the core sections, in sliding engagement therewith, and are anchored in place by small pins 43 that are fast at one end in bores in the adjacent end surfaces of the mandrel sections and are threaded at their opposite ends into the outer peripheral portions of the guide plates. The latter have center holes 43 providing clearance around the actuator shaft 33, and also have holes 44 through which the supporting pins 24 extend with a tight fit. The guide slots 40 and 41 are at least as long as the radial travel of the associated follower pins 42, the slots 40 extending from near the supporting pins 24 to just short of the anchoring pins 43.

The two actuating plates 35 and 36 are disposed against the sides of the guide plates 38 and 39 that are remote from the core sections, in circular recesses in the adjacent ends of the mandrel sections, each actuating plate being somewhat smaller in outside diameter than the associated guide plate. Center holes 45 in the actuating plates snugly receive the actuator shaft 33, to which the actuating plates are coupled by small keys 46 so that the plates rotate back and forth with the shaft.

Spacers 47 are fitted over the supporting pins 24 in front of the rear mandrel section to maintain the rear actuating plate 36 in close sliding relation with the rear guide plate 39, and the collars 27 on the pins similarly maintain the front plates in close sliding relation. Short arcuate slots 48 (see FIGS. 2 and 3), coaxial with the plates, provide clearance in the actuating plates, around the pins, to accommodate the relative rotary movement.

The follower pins 42 are simply cylindrical studs having threaded ends that are received in tapped holes in the core sections, the pins being sized for a close sliding fit in the slots 37$^a$, 37$^b$, 40 and 41, as can be seen in FIGS. 2 and 3. They are arranged in oppositely projecting pairs, one on each side of each core section, and are long enough to extend through the guide slots and well into the cam slots.

In the operation of the apparatus, the end portion of a tube 11 to be belled is heated to a softened condition, in accordance with conventional technology, and then is pushed onto the mandrel, to be expanded by the bevel 19 and to extend across the gap onto the surface 21 of the rear mandrel section 16. Preferably, a stop ring 49 is provided to limit the relative movement of the mandrel and the tube, and to locate the tube on the mandrel.

The core section 29 and 30 may be in either the expanded or the collapsed condition when the mandrel is inserted in the tube, but insertion is facilitated if the core sections are intially contracted, and are expanded only after the tube has been positioned over the gap. Whether such expansion is before or after positioning of the tube, it is effected simply by turning the actuator shaft through a preselected angular increment, from the position shown in FIG. 2 to that shown in FIG. 3. It will be seen in FIG. 2 that the actuating plates are positioned with the follower pins 42 close to the radially inner ends of the cam slots, and also adjacent the radially inner ends of the guide slots. This, of course, holds the core sections in their inwardly contracted or collapsed positions.

As the actuating plates 35 and 36 are rotated in their core-expanding direction, counter-clockwise in FIGS. 2 and 3, the inner sides of the cam slots act as moving ramps or wedges that force the pins outwardly at a rate that is determined by the angle of the slots and the rate of rotation of the plates. At the same time, the pins move radially outwardly along the guide slots 40 and 41, being confined by the two sets of slots to precisely controlled paths that determine and control the motion of the core section. In addition, the inwardly diverging side surfaces 32 of the smaller core sections 29 tend to cam the larger sections 30 outwardly and apart.

As the shaft 33 reaches the end of its preselected increment of rotation, the pins 42 reach the outer end portions of the cam slots and the guide slots. The outer end surfaces of the guide slots may be used as the locating surfaces of the apparatus, in cooperation with the "dwell" portions at the outer ends of the cam slots, but better locating accuracy and precision are obtained in the manner described in connection with the second embodiment of the invention.

When the core sections have been expanded, their outer peripheral surfaces project outwardly beyond the mandrel surfaces 20 and 21, as shown in FIG. 1, and form the continuous external bead for defining the seal groove 14 in the bell 12 on the tube 11. If desired, an external split die ring 50, shown in dot-dash lines in FIG. 1, may be provided to clamp the tube around the mandrel and insure that the inside surface of the tube is firmly against the mandrel and the bead.

When the bell 12 has been formed, the tube 11 is cooled in place until it has set in the desired shape, and then is removed from the mandrel. To permit such removal, the core sections 29 and 30 are retracted by rotation of the shaft 33 and the cam plates 35 and 36 back to the positions shown in FIG. 2, the pins 42 being cammed back inwardly along both sets of slots until it reaches the inner end portions of both associated slots. Precise location is not critical in the collapsed condition, and it is quite satisfactory to use the end surfaces of the slots for this purpose.

DETAILED DESCRIPTION OF THE SECOND EMBODIMENT

Figure 4:
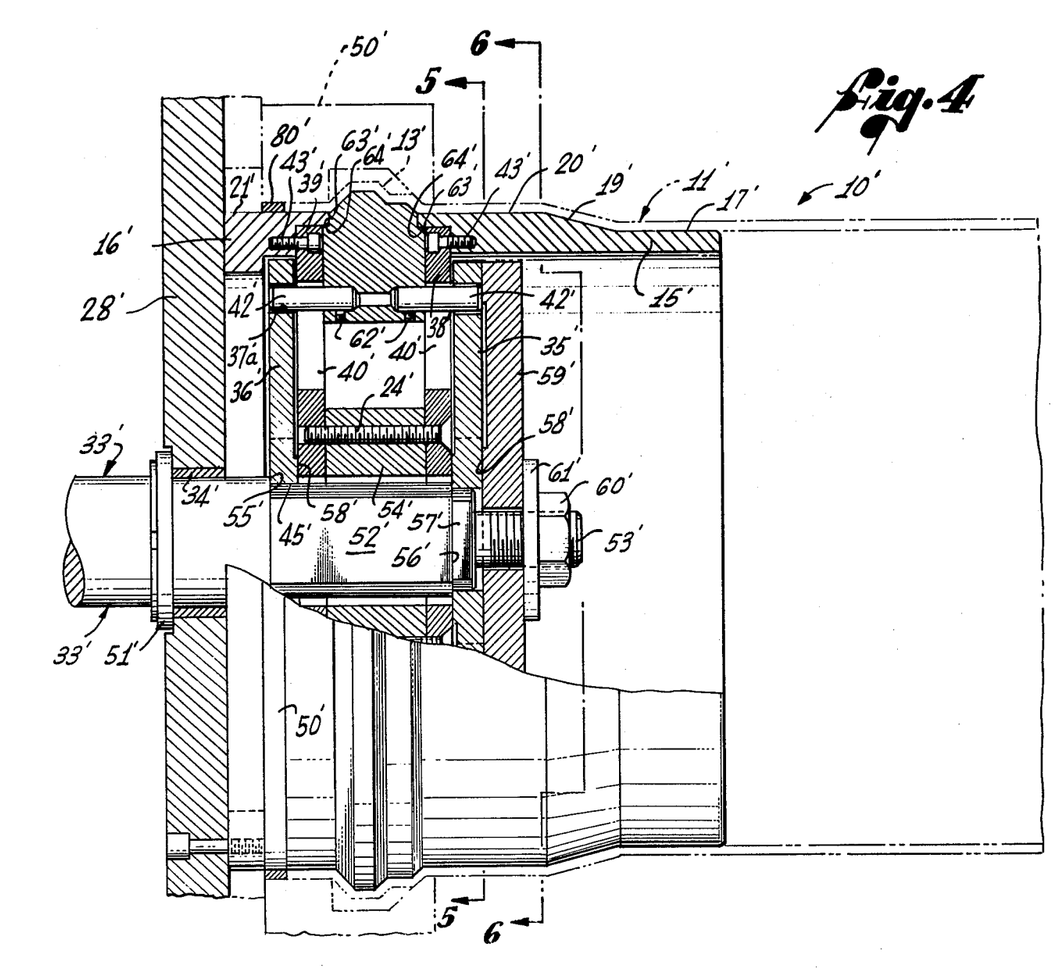
FIG. 4 is a view similar to FIG. 1 showing a second embodiment of the invention, partly in longitudinal cross-section and partly in side elevation.
Figure 5:
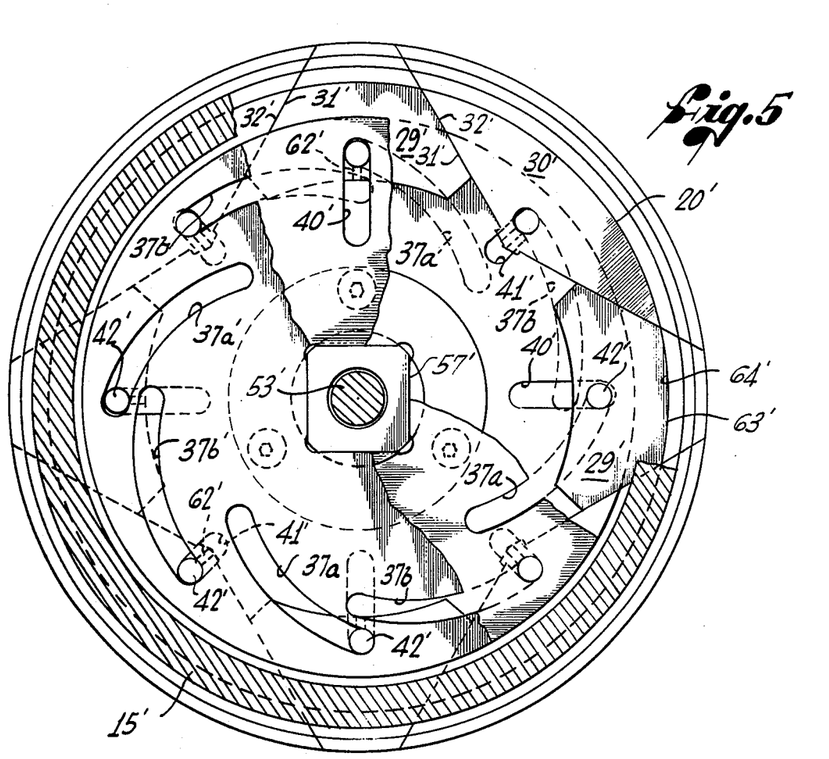
FIG. 5 is a transverse cross-sectional view taken substantially along line 5—5 of FIG. 4, with parts broken away and shown in cross-section.
Figure 6:
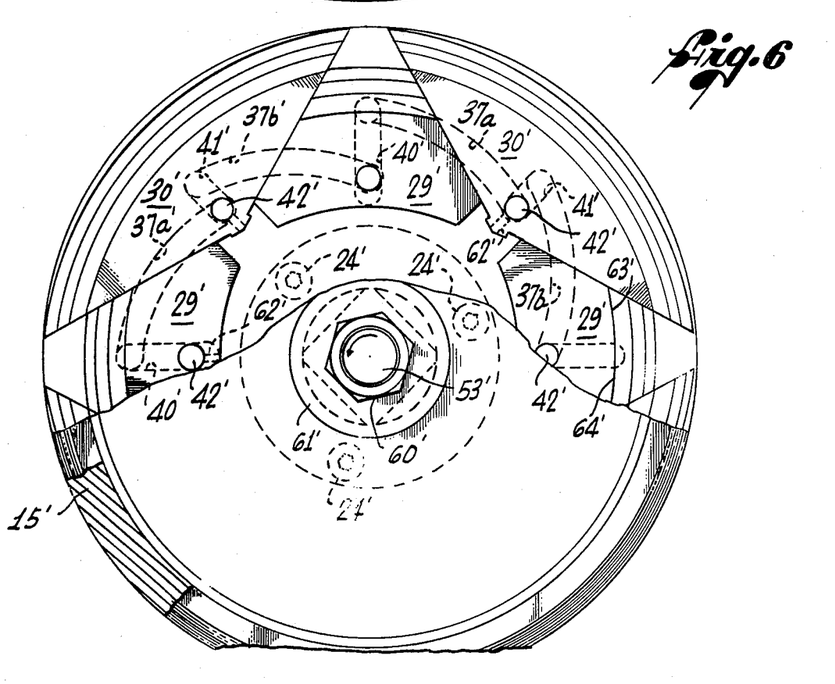
FIG. 6 is a view similar to FIG. 5, taken substantially along line 6—6 of FIG. 4, with parts broken away and shown in cross-section and with parts in moved positions to show the core sections in the collapsed positions.

Shown in FIGS. 4, 5 and 6 is a second embodiment of the invention which is functionally similar to the first embodiment but is of improved construction for simplicity and ease of servicing. In this embodiment, corresponding primed reference numbers are used to indicate corresponding parts, and only the differences are described in detail herein.

As can be seen most clearly in FIG. 4, the mandrel again is formed by front and rear sections 15' and 16' of circular cross-section, disposed in spaced coaxial relation with a gap between them, and the front section is contoured to expand the end of a heated tube 11' as the latter is moved onto the mandrel and across the gap. Two groups of segmental core sections 29' and 30' are arranged in alternating relation in the gap to form a raised annular bead around the mandrel when expanded, as shown in FIGS. 4 and 5, and to be collapsed or contracted inwardly, as shown in FIG. 6. The illustrative bead contour in this case is stepped longitudinally, as shown in FIG. 4. In all other relevant respects, the core sections are as described in connection with the first embodiment.

The actuator shaft 33' of this embodiment is journaled in a bearing sleeve 34' in an end plate 28' bolted to the rear end of the rear mandrel section 16', and has a retaining ring 51' that abuts against the outer side of the end plate. The forward end portion of the shaft projects across the gap into the front mandrel section, beyond the gap, and comprises a central mounting diameter 52', and a threaded end portion 53' inside the front mandrel section. In this embodiment, the central section is square in cross-section to form a keyless mount, to be described.

The guide plates 38' and 39' of the actuating mechanism are disposed against opposite sides of the core means, and are joined together by an annular series of elongated supporting pins 24', herein screws, that have heads on the forward sides of the front guide plate 38' and are threaded into the rear guide plate 39', the plates being clamped by the screws against the opposite sides of a spacer ring 54' that is disposed between the plates. Both the spacer ring and the guide plates have center holes providing clearance around the actuator shaft 33', and radial guide slots 37$^{a'}$ and 37$^{b'}$ are formed in the plates, as before.

Adjacent the outer peripheral edges of the guide plates 38' and 39', screws 43' secure the plates to the front and rear mandrel sections, in recesses in the adjacent ends of the two sections. Accordingly, the front mandrel section 15' is supported on the rear section 16' by an assembly including the stationary guide plates and the screws 24' which tie the plates together.

On opposite sides of the guide plate assembly are the two actuating plates 35' and 36', the rear plate 36' having a square center hole 45' that is fitted snugly over the shaft, and being positioned against a shoulder 55' at the rear end of the square portion 52'. The front actuating plate 35' is positioned against a similar shoulder 56' at the front end of the square section, where the shaft has another flat-sided section 57' of slightly reduced size for supporting this plate. The plate 36' also has a shaped center hole for fitting non-rotatably over the flat-sided section. Clearance preferably is provided between the actuating plates and the adjacent relatively movable parts, except for annular bearing surfaces 58' slidably engaging the guide plates near the center holes thereof.

To hold the plates on the actuator shaft 33', a reinforcing end plate 59' is fitted over the threaded end portion 53' of the shaft, and a nut 60' and a retaining washer 61' hold this plate aganst the adjacent actuating plate 35'. Thus, as the shaft is turned back and forth through its actuating motion, the actuating plates and the end plate turn with the shaft, relative to the guide plates 38' and 39' and to the mandrel sections 15' and 16'.

As before, two aligned follower pins 42' project in opposite directions from each core section, 29' and 30' through radial guide slots 40' and 41' in the guide plates and into cam slots 37$^a$ and 37$^b$ in the actuating plates. These pins are fitted in bores in the core sections, and are held in place by set screws 62'.

The cam sots 37$^a$ and 37$^b$ in this embodiment are arcuate, as shown most clearly in FIG. 5, and do not have special "dwell" configurations, but in all other respects are functionally the same as the slots of the first embodiment. For positive location of the core sections in the expanded condition, outwardly facing arcuate shoulders 63' are formed on the core sections, and inwardly facing annular shoulders 64' are formed on the mandrel sections 15' and 16', at the outer peripheries of the guide plates. These opposed shoulders are easily machined with precision, and locate the core sections positively in the expanded position, thereby facilitating both the precise initial machining of the bead contour and the precise expansion of the core sections in opertion.

It will be evident that the apparatus is relatively simple in construction and can be easily disassembled for service. The nut 60' and the reinforcing end plate 59' are removable through the open front end of the mandrel, after which the front actuating plate 35' can be pulled off for access to the screws 24'. When these have been loosened, the front mandrel section 15' can be removed with the front guide plate 38'. Then the core sections 29' and 30' are removable, and if further break down is desired, the rear set of fasteners 43' can be removed, freeing the rear guide plate 39' and the rear actuating plate 36'. These steps are reversed for reassembly, which is equally simple.

From the foregoing, it will be apparent that the apparatus of the present invention is relatively simple in construction and operation, and at the same time, is capable of very effective and accurate operation in the belling of plastic tubes. It also will be evident that, while two embodiments have been illustrated and specifically described, various modifications and changes can be made without departing from the spirit and scope of the invention.

We claim:

1. An apparatus for molding an internal annular groove adjacent the end of a tubular plastic pipe, comprising an elongated mandrel means to be axially received within the end portion of a plastic pipe for forming said groove, said mandrel means comprising a tubular rear portion, a tubular front portion concentric with said rear portion and an expandable and contractable core means positioned concentrically between said front and rear portions, said core means comprising first and second groups of core sections radially disposed in side-by-side relationship for radial reciprocatory movement in a common radial plane perpendicular to the axis of the mandrel means between retracted positions and projected positions, the core sections of each group being disposed between adjacent pairs of core sections of the other group, the core sections of the first group having radially inwardly diverging surfaces for continuous slidable engagement with radially inwardly converging abutting surfaces provided on the core sections of the second group, the exterior peripheral surfaces of all of the core sections when projected defining a circumferential projection forming the annular groove to be molded, an actuator shaft, means supporting said shaft for concentric rotation in said rear portion of the mandrel means, a pair of axially spaced discs disposed on respective opposite sides of said groups of core sections and fixed on said shaft, cam-and-follower means connecting said discs with the core sections of the first group for moving said core sections from retracted positions to projecting positions in response to rotation in one direction and for moving the first group of core sections from projected positions to retracted positions in response to rotation in the opposite direction, a plurality of support members extending axially between said front and rear mandrel portions to support the front portion on said rear portion in said concentric relationship, said discs having arcuate slots through which said support members extend for permitting angular movement of the discs, means moving the second group of core sections from projecting positions to retracted positions when the first group is retracted, and means guiding said core sections during said reciprocatory movement.

2. The invention defined in claim 1, wherein said cam-and-follower means comprises two elements, one of said two elements being a radially disposed surface provided with a cam recess, the other of said two element being an axially projecting cam follower received in said cam recess.

3. The invention defined in claim 2, wherein said cam recess is provided in at least one of said discs, and said cam follower is fixed on a core section.

4. The invention defined in claim 1, wherein said cam-and-follower means connect said discs with the core sections of both of the first and second groups to positively move core sections of both groups between retracted and projected positions.

5. The invention defined in claim 1, wherein said means for guiding the reciprocatory movement of said core sections comprises at least one radially disposed plate fixedly attached to one of said tubular mandrel portions, and cam-and-follower means connected between said plate and each of said core sections.

6. The invention defined in claim 1, wherein at least two of each group of core sections are provided with an axially projecting cam follower and at least one of said axially spaced discs is provided with a plurality of angularly related slots receive each of said cam followers.

7. The invention defined in claim 6, wherein said means for guiding said core sections includes at least one radial plate fixedly secured to one of said tubular mandrel portions, and at least two of said first group of core sections are provided with axially projecting cam followers received in radially directed recesses in said plate.

8. The invention defined in claim 17, wherein at least two of said second group of core sections are provided with axially projecting cam followers received in radially directed recesses in said plate.

9. The invention defined in claim 8, wherein said guide means includes a pair of radially disposed plates fixedly supported by said mandrel means on respective opposite sides of said groups of core sections and in slidable engagement therewith, said pair of axially spaced discs being disposed outside of said pair of plates.

10. Apparatus for forming an internal annular seal-receiving groove in the end portion of a plastic pipe, comprising:
   an elongated mandrel comprising front and rear tubular mandrel sections disposed in spaced coaxial relation, said front mandrel section being supported on said rear mandrel section;
   radially expandable and contractable core means between said mandrel sections comprising a plurality of radially movable core sections forming a raised annular bead around said mandrel when said core means are expanded, and movable radially inwardly to contracted positions between said mandrel sections;
   an actuator shaft coaxial with said mandrel and extending through said rear mandrel section from the rear end thereof and rotatably supported therein;
   two first plates positioned in the adjacent end portions of said mandrel sections on opposite sides of said core means and mounted on said shaft in axially spaced relation for rotation therewith;
   two axially spaced second plates positioned in the adjacent end portions of said mandrel sections, one alongside each of said first plates, and mounted on said mandrel in angularly fixed positions, whereby said first plates are rotatable alongside said second plates;
   said second plates having a plurality of angularly spaced radial guide slots therein, at least one for each of said core sections, and said first plates having a plurality of angularly spaced cam slots therein, at least one for each of said core sections, each of said cam slots being inclined radially outwardly and across one of said guide slots, in overlying relation therewith;
   and at least one follower on each side of each of said core sections projecting into a guide slot of one of said second plates and the overlying cam slot in one of said first plates, to be cammed radially back and forth upon back and forth rotation of said plates and simultaneously guided radially in and out by said guide slots.

11. Apparatus as defined in claim 10, in which said second plates are positioned alongside said core sections and said first plates are positioned against the sides of said second plates remote from said core sections.

12. Apparatus as defined in claim 11, in which said second plates extend radially beyond said first plates, and further including means securing the outer portion of each of said second plates to the adjacent mandrel section.

13. Apparatus as defined in claim 10, in which said followers are pins secured to said core sections and extending through said guide slots and into said cam slots.

14. Apparatus as defined in claim 10 in which said front mandrel section is supported on said rear mandrel section by means of a plurality of angularly spaced, elongated support members having rear ends connected to said rear mandrel section and front ends connected to said front mandrel section said support members extending through said plates and across the space between said mandrel sections radially inwardly from the contracted position of said core means, and said first plates having openings therein permitting back and forth rotation relative to said support members.

* * * * *

UNITED STATES PATENT AND TRADEMARK OFFICE
CERTIFICATE OF CORRECTION

PATENT NO. : 4,080,140
DATED : March 21, 1978
INVENTOR(S) : Clyde E. Wilson, et al.

It is certified that error appears in the above-identified patent and that said Letters Patent are hereby corrected as shown below:

In the Abstract - Third line from the bottom,
                delete "shapted" and insert
                therefore --shaped--

Column 5,   line 42, change "section" to --sections--
            line 66, change "section" to --sections--

Column 7,   line 34, change "aganst" to --against--
            line 59, change "opertion" to --operation--

Column 8,   line 54, change "projecting" to --projected--
            line 62, change "element" to --elements--

UNITED STATES PATENT AND TRADEMARK OFFICE
CERTIFICATE OF CORRECTION

PATENT NO. : 4,080,140
DATED : March 21, 1978
INVENTOR(S) : Clyde E. Wilson, et al.

Page 2 of 2

It is certified that error appears in the above-identified patent and that said Letters Patent are hereby corrected as shown below:

Column 9, line 14, after "slots" insert --to-- line 22, delete "claim 17" and insert         therefore --claim 7--

Column 10, line 23, after "said" insert --first--

*Signed and Sealed this*

*Seventeenth* Day of *October 1978*

[SEAL]

Attest:

RUTH C. MASON
Attesting Officer

DONALD W. BANNER
Commissioner of Patents and Trademarks